United States Patent [19]
Tajima

[11] Patent Number: 5,992,147
[45] Date of Patent: Nov. 30, 1999

[54] HYDRAULIC CONTROL SYSTEM IN CONSTRUCTION MACHINE

[75] Inventor: Kazuharu Tajima, Hiroshima, Japan

[73] Assignee: Kabushiki Kaisha Kobe Seiko Sho, Kobe, Japan

[21] Appl. No.: 09/065,460

[22] Filed: Apr. 24, 1998

[30] Foreign Application Priority Data

Apr. 25, 1997 [JP] Japan ................................. 9-123013

[51] Int. Cl.⁶ ................................................ F16D 31/02
[52] U.S. Cl. .............................. 60/445; 60/468; 60/469
[58] Field of Search ........................... 60/422, 445, 468, 60/469, 494; 91/444

[56] References Cited

U.S. PATENT DOCUMENTS 3,871,178   3/1975   Tominaga ................................. 60/445
5,421,155   6/1995   Hirata et al. ............................. 60/494
5,680,760  10/1997   Lunzman ................................. 60/468

*Primary Examiner*—F. Daniel Lopez
*Attorney, Agent, or Firm*—Oblon, Spivak, McClelland, Maier & Neustadt, P.C.

[57] ABSTRACT

A hydraulic control system in a construction machine is provided with a hydraulic pump delivering hydraulic oil, a directional control valve controlling flow of the hydraulic oil, an actuator driven by the hydraulic oil outputted from the directional control valve, and a tank into which the hydraulic oil delivered from the hydraulic pump is bleeded. A cut-off valve controlling flow of the bleeded hydraulic oil is arranged between the directional control valve and the tank. Transient characteristics are added to a signal controlling the cut-off valve so that variation of the signal is suppressed to be small. Transient characteristics are added also to a signal controlling the hydraulic pump so that variation of the signal is suppressed to be small. Thereby the construction machine can travel smoothly.

4 Claims, 4 Drawing Sheets

F I G. 1
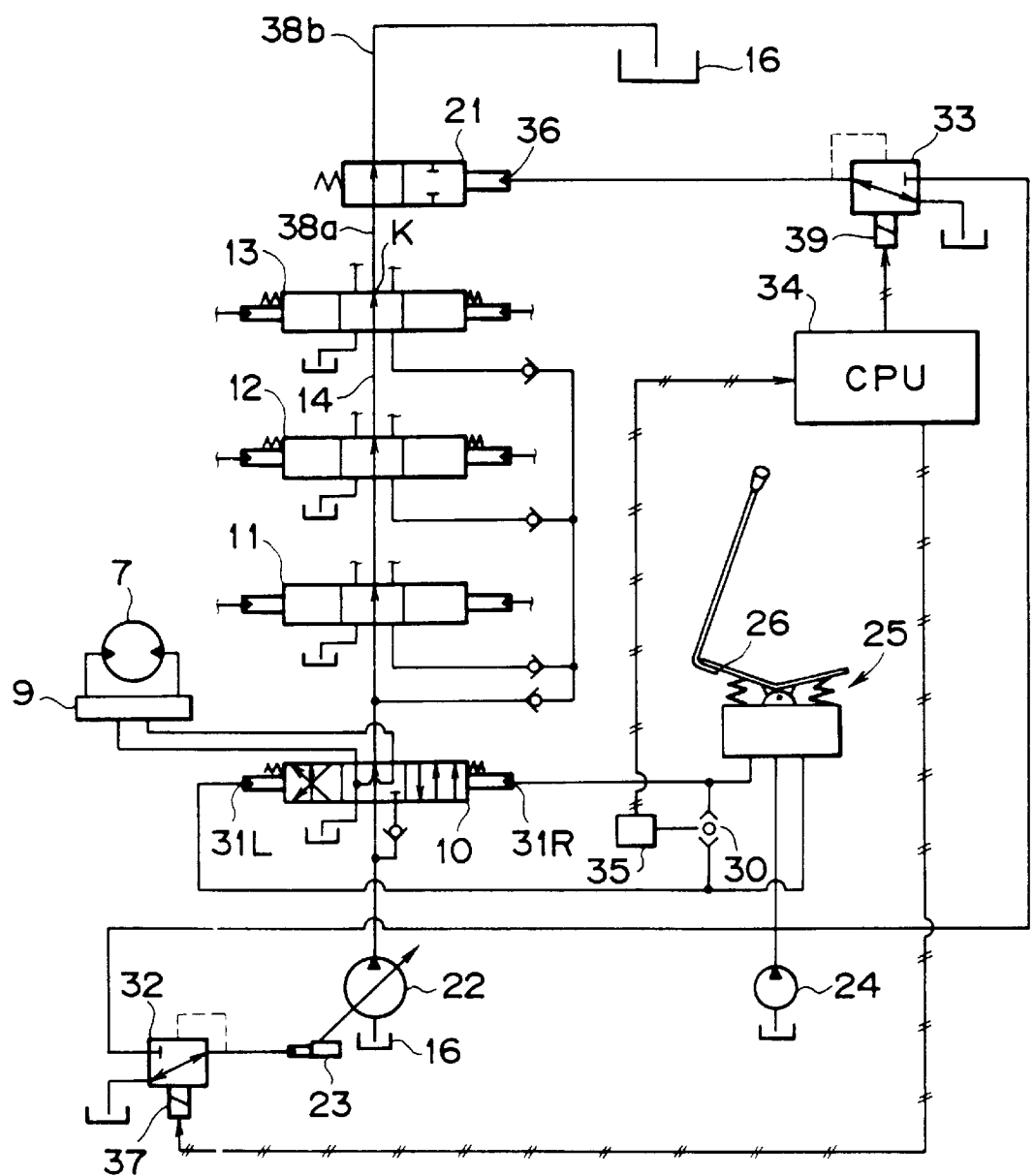

HYDRAULIC CONTROL SYSTEM IN CONSTRUCTION MACHINE

BACKGROUND OF THE INVENTION

1. Field of the Invention

The present invention relates to mainly a hydraulic control system in a construction machine such as a hydraulic excavator.

2. Description of the Related Art

Conventionally in a hydraulic excavator of crawler type, since a car body is vibrated while running on the rough ground, hands supporting a traveling lever can not hold the traveling lever to a definite position. Therefore pilot pressure drawn from a traveling hydraulic remote control valve arranged at lower side of the traveling lever is varied, and hydraulic oil corresponding to rocking of the traveling lever flows into the hydraulic oil flowing-in side of the traveling motor and the traveling of the hydraulic excavator becomes unstable.

SUMMARY OF THE INVENTION

It is an object of the present invention to provide a hydraulic control system in a construction machine wherein hunting does not occur and the smooth traveling can be performed A hydraulic control system of the present invention is provided with a hydraulic pump delivering the hydraulic oil, a directional control valve controlling flow of the hydraulic oil, an actuator driven by the hydraulic oil outputted from the directional control valve, and a tank into which the hydraulic oil delivered from the hydraulic pump is bleeded. A cut-off valve controlling flow of the bleeded hydraulic oil is arranged between the directional control valve and the tank. Cut-off valve control means adds transient characteristics so that variation of a signal controlling the cut-off valve is suppressed to be small.

Therefore the hunting during the traveling of the construction machine can be suppressed and the construction machine can be allowed to travel more smoothly. Also since the cut-off valve provided separately from the directional control valve at the upstream side is controlled, the control of the directional control valve at the upstream side is scarely affected by the transient characteristics added to the control of the cut-off valve and the directional control valve at the upstream side can be controlled more easily. For example, the rectilinear motion control to stabilize the rectilinear traveling property becomes easier. Further price of the whole device can be made cheap.

Also transient characteristics may be added by the hydraulic pump control means so that variation of a signal controlling the hydraulic pump is suppressed to be small.

In this case, since not only the cut-off valve but also the hydraulic pump are controlled smoothly, the traveling becomes smoother.

BRIEF DESCRIPTION OF THE DRAWINGS

FIG. 1 is a hydraulic circuit diagram of a construction machine showing an embodiment of the invention;

DESCRIPTION OF THE PREFERRED EMBODIMENTS

Figure 2:
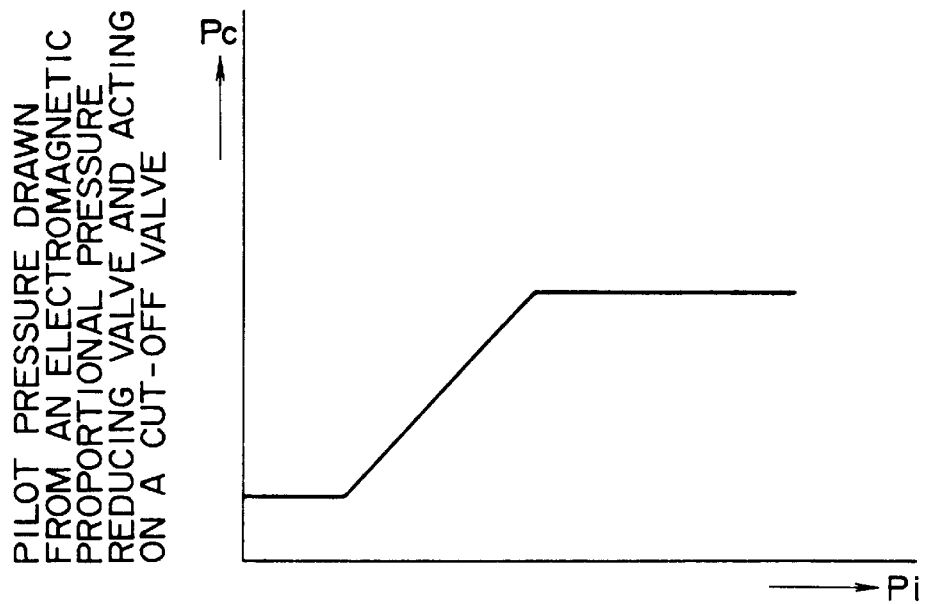
FIG. 2 is a graph showing relation between pilot prey Pi drawn from a traveling hydraulic remote control valve during stable traveling of a construction machine and pilot pressure Pc from an electromaganetic proportional pressure reducing valve acting on a cut-off valve.

FIG. 1 is a circuit diagram of a main part of a construction machine showing an embodiment of the present invention. In FIG. 1, numeral 7 designates a traveling motor being an actuator. Numeral 9 designates a brake valve of the traveling motor 7. Numeral 10 designates a traveling pilot operated directional control valve being a directional control valve controlling the traveling motor 7. Numerals 11, 12, 13 designate pilot operated directional control valves controlling actuators for a working machine other than the traveling motor 7 installed on the construction machine. Numeral 14 designates a center bypass oil passage penetrating each neutral position of the pilot operated directional control valves 10, 11, 12, 13 for returning oil toward an oil tank 16. Numeral 21 designates a cut-off valve installed between the downstream side outlet K of the center bypass oil passage 14 and the oil tank 16 and capable of being changed from the open oil passage position to the cut-off oil passage position by the pilot pressure. Numeral 22 designates a hydraulic pump of variable displacement type delivering the main hydraulic oil. Numeral 23 designates a regulator of the hydraulic pump 22. Numeral 24 designates a pilot pump being a pilot hydraulic source. Numeral 25 designates a traveling hydraulic remote control valve. Numeral 26 designates a pedal with a traveling lever operating the traveling hydraulic remote control valve 25. Numeral 30 designates a shuttle valve detecting and selecting the pilot pressure acting on pilot ports 31L, 31R at left and right sides of the traveling pilot operated directional control valve 10. Numerals 32, 33 designate electromagnetic proportional pressure reducing valves. Numeral 34 designates a controller. Numeral 35 designates a pressure sensor as operation detecting means for the traveling pilot operated directional control valve 10.

FIG. 2 is a graph showing relation between pilot pressure drawn from the traveling hydraulic remote control valve 25 (more specifically pilot secondary pressure from the pilot pump 24) Pi when the construction machine runs on the flat surface stably and pilot pressure Pc from the electromagnetic proportional pressure reducing valve 33 acting on the pilot port 36 of the cut-off valve 21.

Next, constitution of the construction machine of the present invention will be described using FIG. 1. In the embodiment of the present invention, the pressure sensor 35 is provided as change operation detecting means for detecting the change operation of the traveling pilot operated directional control valve 10. A signal from the pressure sensor 35 is inputted to the controller 34. The electromagnetic proportional pressure reducing valve 32 drawing the pilot pressure is connected to the regulator 23 of the hydraulic pump 22. Based on the signal from the pressure sensor 35, command current value I2 adding the transient characteristics is calculated so that the controller 34 suppresses variation of the signal to be small within the control period ΔT set to the controller 34. The period ΔT is a control period set to the prescribed short time. The calculated command current value I2 is outputted to a solenoid 37 of the electromagnetic proportional pressure reducing valve 32. Also the center bypass oil passage 14 penetrates each neutral position of the traveling pilot operated directional control valve 10 and the pilot operated directional control valves 11, 12, 13 controlling other actuators. The cut-off valve 21 controlling the bleed-off is installed at pipe lines 38a, 38b connecting the outlet K of the center bypass oil passage 14 and the tank 16. The electromagnetic proportional pressure reducing valve 33 drawing the pilot pressure is connected to the pilot port 36 of the cut-off valve 21. Based on the signal from the pressure sensor 35, the command current value I2 adding the transient characteristics is calculated so that the controller 34 suppresses variation of the signal to be small within the control period ΔT, and the calculated command current value I2 is outputted to a solenoid 39 of the electromagnetic proportional pressure reducing valve 33.

In the controller 34, based on the signal from the pressure sensor 35, the controller 34 calculates difference between the present time command current value I1 obtained by calculating from the present time pilot pressure and the preceding time command current value I0 obtained by calculating at the preceding time prior to the present time by the set control period ΔT, that is, the increment current value ΔI by following formula $$\Delta I = I1 - I0$$

As the threshold value ΔI' of the increment current value ΔI, the command current maximum variation width value (I maxi–I mini) within the control period ΔT is multiplied by ratio (T0/ΔT) of the required delay time T0 to the control period ΔT, and based on the product obtained by the multiplying, i.e., based on the following formula, the delay time specific current value ΔI' being the threshold value is calculated.

$$\Delta I' = (I \text{ maxi} - I \text{mini}) \times T0/\Delta T$$

When the absolute value of the increment current value ΔI is more than the absolute value of the delay time specific current value ΔI' and the present time command current value I1 is more than the preceding time command current value I0, the command current value I2 with the transient characteristics added is calculated by sum of the preceding time command current value I0 and the delay time specific current value ΔI', i.e., by following formula.

$$I2 = I0 + \Delta I'$$

In similar manner to the above-mentioned case, when the absolute value of the increment current value ΔI is more than the absolute value of the delay time specific current value ΔI' but the present time command current value I1 is less than the preceding time command current value I0, the command current value I2 with the transient characteristics added is calculated by difference between the preceding time command current value I0 and the delay time specific current value ΔI', i.e., following formula.

$$I2 = I0 - \Delta I'$$

When the absolute value of the increment current value ΔI is equal to or less than the absolute value of the delay time specific current value ΔI', the command current value I2 with the transient characteristics added is calculated to the value equal to the present time command current value I1.

Figure 3:
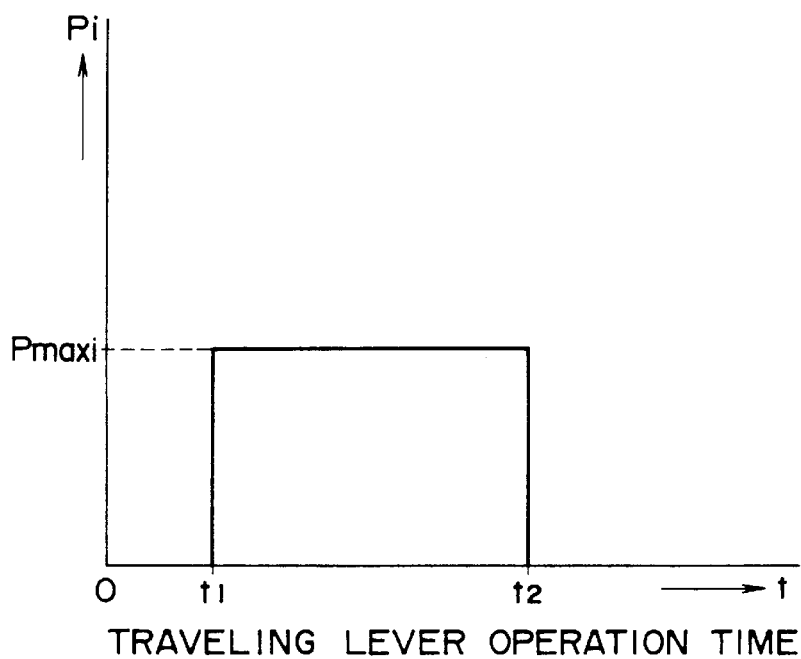
FIG. 3 is a graph showing relation between traveling lever operation time t and pilot pressure Pi acting on a traveling pilot operated directional control valve.
Figure 4:
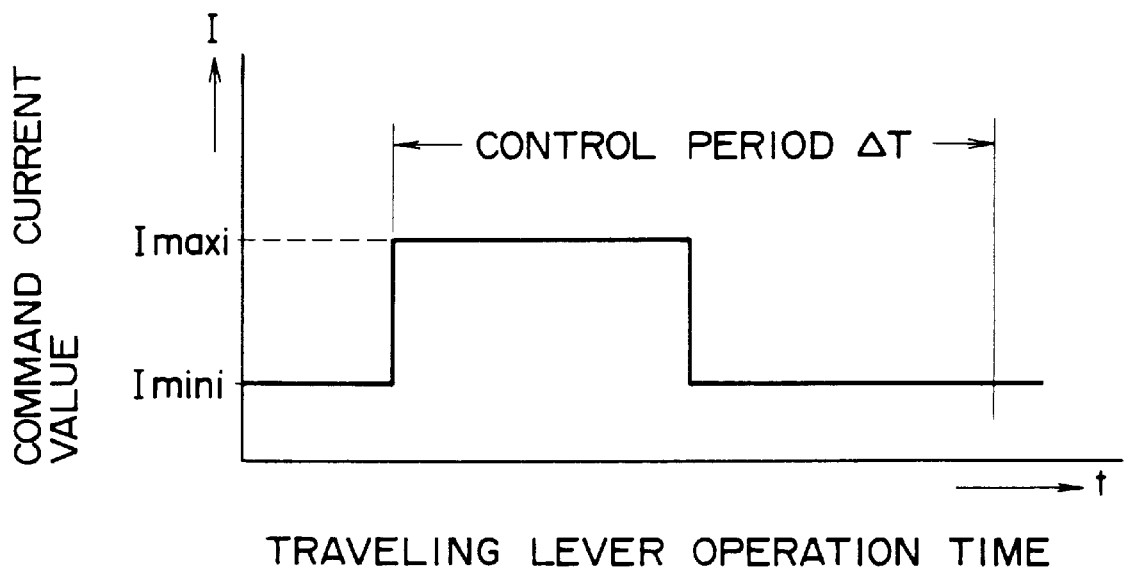
FIG. 4 is a graph showing relation between traveling lever operation time t and command current I when operation of adding transient characteristics by a controller is not performed in FIG. 3.

Next, function of the construction machine in this embodiment will be described. Signals from the pressure sensor 35 are inputted every moment to the controller 34 in this embodiment. FIG. 3 is a graph showing state that while the operation time t of the pedal 26 with traveling lever is from t1 seconds to t2 seconds, the pilot pressure Pi acting on the pilot port 31L or 31R of the traveling pilot operated directional control valve 10 is maintained to the maximum pressure FIG. 4 is a graph showing relation between the traveling lever operation time t and the command current I when there is no operation adding the transient characteristics in this embodiment.

Figure 5:
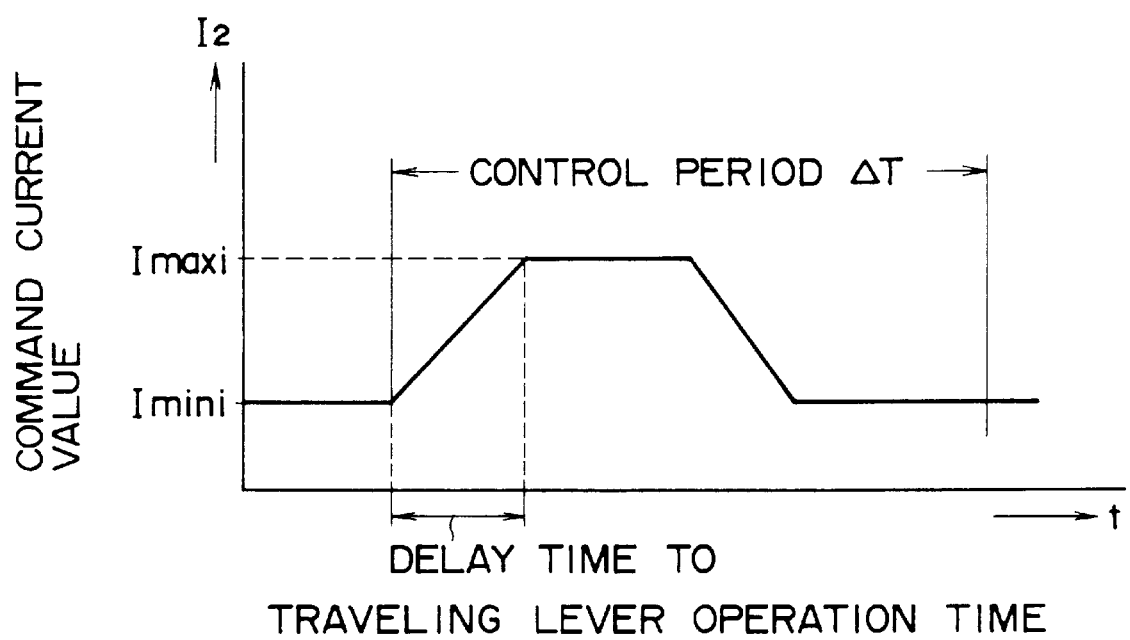
FIG. 5 is a graph showing relation between traveling lever operation time t and command current I2 when operation is performed adding transient characteristics according to the invention by a controller in FIG. 3.

FIG. 5 is a graph showing relation between the traveling lever operation time t and the command current I2 when the operation adding the transient characteristics in this embodiment is performed.

In this embodiment, based on the signal from the pressure sensor 35, the controller 34 compares the increment current value ΔI of the command current value during the control period ΔT with the delay time specific current value ΔI' of the command current maximum variation width value (I maxi–I mini) per the control period ΔT. When the absolute value of the increment current value ΔI is more than the absolute value of ΔI' and the present time command current I0 is more than the preceding time command current value I0, the command current value I2 is calculated as sum of the preceding time command current value I0 and the delay time specific current value ΔI'. Consequently the command current value I2 in this case is calculated as the command current value more than the preceding time command current value I0 but less than the present time command current value I0. Also when the absolute value of the increment current value ΔT is more than the absolute value of ΔI' and the present time command current value I1 is less than the preceding time command current value I0, the command current value I2 is calculated as difference between the preceding time command current value I0 and the delay time specific current value ΔI'. Consequently the command current value I2 in this case is calculated as the command current value less than the preceding time command current value I0 but more than the present time command current value I1. Also when the absolute value of the increment current value Δ1 is equal to or less than the absolute value of ΔI', since the increment current value ΔI itself is not a large value, the command current value I2 is calculated as the command current value with the same value as that of the present time command current value I1. That is, as above described, the command current value I2 is calculated every moment as the command current value within the range of the preceding time command current value I0 and the present time command current value I1. Next, the command current is outputted from the controller 34 to the solenoids 37, 39 of the electromagnetic proportional pressure reducing valves 32, 33.

State of the pump flow rate corresponding to rocking and vibrating of the pedal 26 with traveling lever will be described using a graph.

Figure 6:
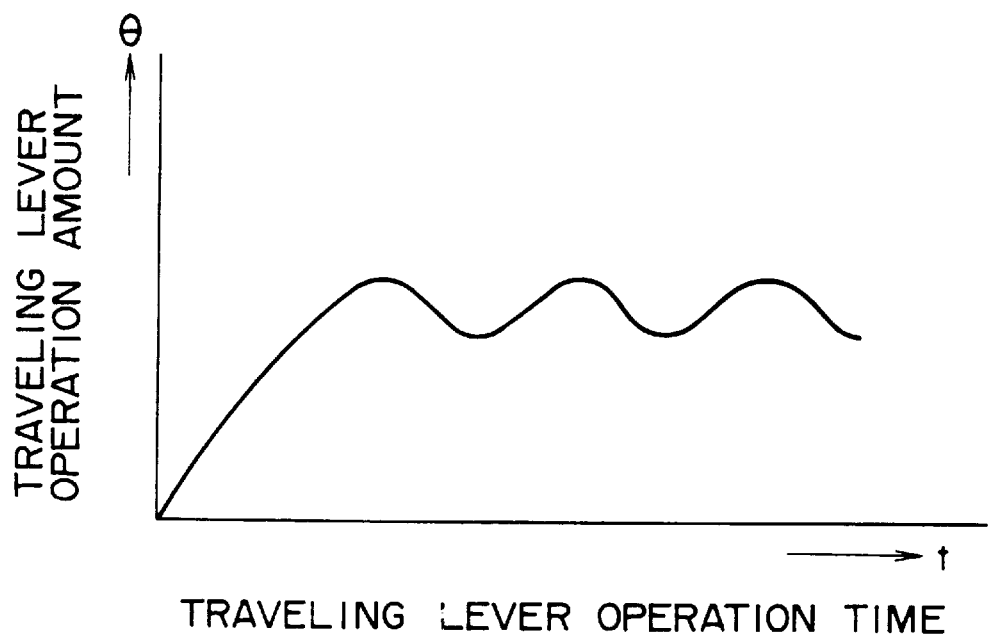
FIG. 6 is a graph showing relation between traveling lever operation time t and traveling lever operation amount θ.
Figure 7:
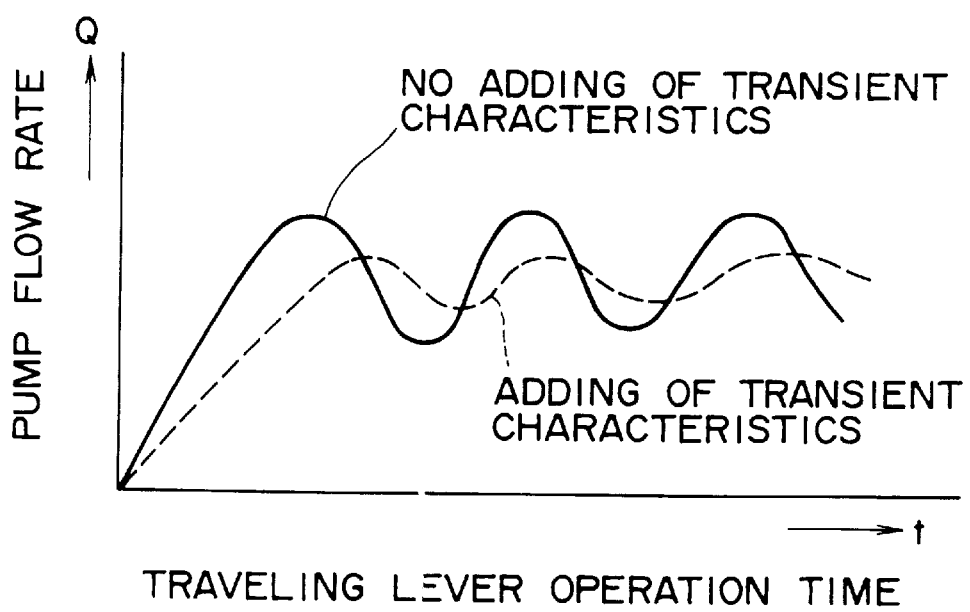
FIG. 7 is a graph showing relation between traveling lever operation time t and pump flow rate Q in traveling lever operation state being varied in FIG. 6.

FIG. 6 is a graph showing relation between the traveling lever operation time t and the traveling lever operation amount θ. FIG. 7 is a graph showing relation between the traveling lever operation time t and the pump flow rate Q in the traveling lever operation state being varied in FIG. 6. In FIG. 7, the pump flow rate variation curve shown in solid line represents the state that operation of adding the transient characteristics in this embodiment is not performed. Also the pump flow rate variation curve shown in broken line represents the state that operation of adding the transient characteristics in this embodiment is performed. As shown in FIG. 7, when the operation of adding the transient characteristics in this embodiment is performed in the controller 34, variation of the pump flow rate Q can be suppressed to be small. That is, in this embodiment, the command current with transient characteristics added is outputted from the controller 34 to the solenoid 37 of the electromagnetic proportional pressure reducing valve 32 connected to the regulator 23 of the hydraulic pump 22. It is outputted also to the solenoid 39 of the electromagnetic proportional pressure reducing valve 33 connected the pilot port 36 of the cut-off valve 21. Therefore the sudden change in the slant turning of the pump swash plate can be reduced and the abrupt bleed-off action of the cut-off valve 21 can be suppressed. Consequently the sudden change of the pump flow rate can be suppressed and the smooth traveling can be performed without producing the hunting.

In this embodiment, control of the cut-off valve 21 controlling the flow rate of the hydraulic oil bleeded from the hydraulic pump 22 to the tank 16 is provided with the transient characteristics, and closing of the flow passage for the relief to the tank 16 is delayed thereby the abrupt increase of the meter-in flow rate flowing from the hydraulic pump 22 through the traveling pilot operated directional control valve 10 into the traveling motor 7 is suppressed and the traveling hunting is prevented. However, the present invention can be applied not only to prevent the traveling hunting but also to prevent the swivel hunting in the construction machine of upper swivel type. Also although the traveling hydraulic remote control valve 25 is used in this embodiment, the present invention can be applied also to the case of the joy stick. Further the cut-off valve 21 can be driven directly in the electromagnetic driving not through the electromagnetic proportional pressure reducing valve.

I claim:

1. A hydraulic control system in a construction machine, comprising:
   a hydraulic pump delivering hydraulic oil;
   a directional control valve controlling flow of the hydraulic oil;
   an actuator driven by the hydraulic oil outputted from said directional control valve;
   a tank into which the hydraulic oil delivered from said hydraulic pump is bleeded;
   a cutoff valve arranged between said directional control valve and said tank for controlling flow of the bleeded hydraulic oil; and
   cut-off valve control means for adding transient characteristics so that variation of a signal controlling said cut-off valve is suppressed to be small.

2. A hydraulic control system in a construction machine according to claim 1, wherein said cut-off valve control means performs steps of:
   calculating difference between the present time command current value obtained by calculating from a signal at the present time and the preceding time command current value obtained by calculating at the preceding time prior to the present time by the set control period;
   calculating a threshold value from the maximum variation width value of the command current value within the control period, multiplied by required ratio of the delay time to the control period;
   controlling said cut-off valve by sum of the preceding time command current value, when the absolute value of the difference is more than the absolute value of the threshold value and the present time command current value is more than the preceding time command current value;
   controlling said cut-off valve by difference between the preceding time command current value and the threshold value, when the absolute value of the difference is more than the absolute value of the threshold value and the present time command current value is less than the preceding time command current value; and
   controlling said cut-off valve by the present time command current value, when the absolute value of the difference is equal to or less than the absolute value of the threshold value.

3. A hydraulic control system in a construction machine according to claim 1, further comprising:
   hydraulic pump control means for adding transient characteristics so that variation of a signal controlling said hydraulic pump is suppressed to be small.

4. A hydraulic control system in a construction machine according to claim 3, wherein said hydraulic pump control means performs steps of:
   calculating difference between the present time command current value obtained by calculating from a signal at the present time and the preceding time command current value obtained by calculating at the preceding time prior to the present time by the set control period;
   calculating a threshold value from the maximum variation width value of the command current value within the control period, multiplied by required ratio of the delay time to the control period;
   controlling said hydraulic pump by sum of the preceding time command current value and the threshold value, when the absolute value of the difference is more than the absolute value of time threshold value and the present time command current value is more than the preceding time command current value;
   controlling said hydraulic pump by difference between the preceding time command current value and the threshold value, when the absolute value of the difference is more than the absolute value of the threshold value and the present time command current value is less than the preceding time command current value; and
   controlling said hydraulic pump by the present time command current value, when the absolute value of the difference is equal to or less than the absolute value of the threshold value.

* * * * *